United States Patent [19]

Young et al.

[11] Patent Number: 5,722,810
[45] Date of Patent: Mar. 3, 1998

[54] OVER-CENTER LOCKING MECHANISM FOR TOW TRUCK WHEEL-LIFT OR THE LIKE

[75] Inventors: Charles E. Young; Scott A. Watson, both of Falling Waters, W. Va.

[73] Assignee: Jerr-Dan Corporation, Greencastle, Pa.

[21] Appl. No.: 554,826

[22] Filed: Nov. 7, 1995

[51] Int. Cl.$^6$ ............................................. B60P 3/12
[52] U.S. Cl. ........................... 414/563; 280/402; 414/427
[58] Field of Search ......................... 414/426–430, 414/563, 921, 540, 545, 556, 557; 280/402; 200/47

[56] References Cited

U.S. PATENT DOCUMENTS

| | | | |
|---|---|---|---|
| 2,183,478 | 12/1939 | Holmes et al. | 414/563 |
| 2,436,000 | 2/1948 | Fleming | 414/563 |
| 2,449,146 | 9/1948 | Ryan | 414/563 |
| 2,495,493 | 1/1950 | Wright | 414/563 X |
| 2,625,278 | 1/1953 | Sensenbaugh | 414/563 |
| 2,793,770 | 5/1957 | St. Denis | 414/563 |
| 3,434,607 | 3/1969 | Nelson | 414/563 |
| 3,667,630 | 6/1970 | Scott | 414/563 |
| 3,667,631 | 6/1972 | Bishop | 414/563 |
| 3,951,280 | 4/1976 | Peck | 414/563 |
| 4,034,873 | 7/1977 | Harirg | 414/563 |
| 4,176,999 | 12/1979 | Thorley | 414/540 |
| 4,186,938 | 2/1980 | Youngblood | 280/402 |
| 4,194,755 | 3/1980 | Youngblood | 280/402 |
| 4,384,817 | 5/1983 | Peterson | 414/563 |
| 4,392,771 | 7/1983 | Smalley | 414/921 X |
| 4,407,623 | 10/1983 | Parks | 414/540 |
| 4,451,193 | 5/1984 | Cannon, Jr. et al. | 414/563 |
| 4,473,334 | 9/1984 | Brown | 414/563 |
| 4,487,544 | 12/1984 | Hubbard | 414/563 |
| 4,493,603 | 1/1985 | Williams et al. | 414/921 X |
| 4,564,207 | 1/1986 | Russ et al. | 280/402 |
| 4,573,857 | 3/1986 | Porter, Sr. et al. | 414/563 |
| 4,583,466 | 4/1986 | Reddy et al. | 414/921 X |
| 4,632,629 | 12/1986 | Kooima | 414/563 |
| 4,634,337 | 1/1987 | Hamman | 414/563 |
| 4,640,660 | 2/1987 | Watson | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |

(List continued on next page.)

FOREIGN PATENT DOCUMENTS

2238290  5/1995  United Kingdom.

OTHER PUBLICATIONS

Abstract of Canadian Patent No. 2069809–A, Issued May 28, 1992, "Wheel Engaging System for Towing Vehicle Wheel Lifts", Derwent Publications Ltd. London, England 1993.

Primary Examiner—David A. Bucci
Attorney, Agent, or Firm—McDermott, Will & Emery

[57] ABSTRACT

The present invention relates to a wheel grid assembly and vehicle towing apparatus. The wheel grid assembly includes a wheel boom and a pair of lift arms. Each lift arm consists of an extension arm segment and an engaging arm segment pivotally mounted to the extension arm segment. Each engaging arm segment is made up of an actuating arm segment and a gripping arm segment extending in different directions from the pivot point. A pair of linear actuators rotate the engaging arm segments about their pivot points to engage the wheels of a vehicle to be towed. Each linear actuator is attached to an engaging arm segment through an over-center locking mechanism. The over-center locking mechanisms lock the engaging arm segments in wheel engaging positions without aid of force from the linear actuators. The present invention also relates to a position lock mechanism and a wheel grid self-centering device. Additionally, the present invention provides a wheel spacer for creating adjustability in the lift arms to accommodate variations in wheel size, and an automatic linear actuator control line retractor assembly. The wheel grid assembly of the present invention may be incorporated with an extensible main boom, and utilized with various configurations of tow vehicles.

29 Claims, 14 Drawing Sheets

U.S. PATENT DOCUMENTS

| | | | |
|---|---|---|---|
| 4,701,099 | 10/1987 | Müller | 414/563 |
| 4,737,066 | 4/1988 | Allison, Jr. | 414/563 |
| 4,741,661 | 5/1988 | Carey | 414/563 |
| 4,761,110 | 8/1988 | Boutilier | 414/563 |
| 4,761,111 | 8/1988 | Brown | 414/563 |
| 4,775,285 | 10/1988 | Zackovich | 414/563 |
| 4,793,763 | 12/1988 | Bubik | 414/563 |
| 4,797,057 | 1/1989 | Shoup et al. | 414/563 |
| 4,797,058 | 1/1989 | Bilas | 414/563 |
| 4,798,509 | 1/1989 | Bubik | 414/563 |
| 4,815,915 | 3/1989 | Crupi, Jr. | 414/563 |
| 4,836,737 | 6/1989 | Holmes et al. | 414/563 |
| 4,838,753 | 6/1989 | Gehman et al. | 414/563 |
| 4,859,134 | 8/1989 | Lock | 414/563 |
| 4,861,221 | 8/1989 | Krisa | 414/563 |
| 4,871,291 | 10/1989 | Moore et al. | 414/563 |
| 4,874,285 | 10/1989 | Bubik | 414/563 |
| 4,904,146 | 2/1990 | Lock et al. | 414/563 |
| 4,917,563 | 4/1990 | Pollner et al. | 414/430 X |
| 4,927,315 | 5/1990 | Nespor | 414/563 |
| 4,946,182 | 8/1990 | Weber | 280/402 |
| 4,948,327 | 8/1990 | Crupi, Jr. | 414/563 |
| 4,968,052 | 11/1990 | Alm et al. | 280/402 |
| 4,993,909 | 2/1991 | Hamman | 414/563 |
| 5,013,205 | 5/1991 | Schardt | 414/429 |
| 5,013,209 | 5/1991 | DeMichele et al. | 414/563 |
| 5,249,909 | 10/1993 | Roberts et al. | 414/476 |
| 5,259,572 | 11/1993 | Franken et al. | 244/50 |
| 5,269,553 | 12/1993 | Alonso | 280/402 |
| 5,302,074 | 4/1994 | Elfström | 414/427 |
| 5,326,216 | 7/1994 | Russ | 414/563 |
| 5,336,037 | 8/1994 | Cürten et al. | 414/429 |
| 5,350,271 | 9/1994 | Weller | 414/563 |
| 5,352,083 | 10/1994 | Roberts et al. | 414/477 |
| 5,354,167 | 10/1994 | Cullum et al. | 414/563 |
| 5,391,044 | 2/1995 | Young | 414/563 |

FIG. I

OVER-CENTER LOCKING MECHANISM FOR TOW TRUCK WHEEL-LIFT OR THE LIKE

BACKGROUND OF THE INVENTION

The present invention relates to tow trucks, for towing a disabled automobile, and more particularly to a tow assembly for tow trucks which engage and lift the two front wheels or the two rear wheels of an automobile.

Tow trucks, for towing disabled automobiles by lifting either the front or rear wheels off the ground, and towing the partially-lifted automobile on its remaining two wheels, have long been used. The more modern and readily used types of tow trucks are known as a "wheel-lift" tow trucks. A wheel lift tow truck engages and lifts the vehicle to be towed at either its front or rear wheels (tires).

Wheel-lift tow trucks generally employ a telescoping or folding main boom element attached to the rear of the truck and extending rearwardly from or out beyond the truck's rear deck (the space between the rear of the cab and the rear bumper). The boom or crane element represents the main lifting or leverage component for lifting one end of the vehicle to be towed. Such tow trucks also utilize a wheel engaging apparatus, hereinafter referred to as the wheel grid, for engaging and holding the front or rear wheels of a vehicle. The wheel grid typically consists of a cross arm or wheel boom pivotally attached to the end of the main boom, and wheel retainers or lifting arms for engaging the wheels of the vehicle to be towed. When positioning the system for towing, the wheel boom is maneuvered into a position against the tread of the tires and the lifting arms are then locked into a position securing the tires in place against the wheel boom.

Examples of such a wheel-lift tow truck include: Youngblood, U.S. Pat. Nos. 4,186,938 and 4,194,755; LoCodo, U.S. Pat. No. 4,264,262; Lind, U.S. Pat. No. 4,473,237; Brown, U.S. Pat. No. 4,473,334; Russ, U.S. Pat. No. 4,564,207; Capers et al., U.S. Pat. No. 4,678,392; Muller, U.S. Pat. No. 4,701,099; Carey, U.S. Pat. No. 4,741,661; Brown, U.S. Pat. No. 4,761,111; Shoup et al., U.S. Pat. No. 4,797,057; Nespor, U.S. Pat. No. 4,927,315; Schardt, U.S. Pat. No. 5,013,205; DeMichele et al., U.S. Pat. No. 5,013,209; Franken et al., U.S. Pat. No. 5,259,572; Elfstrom, U.S. Pat. No. 5,302,074; Russ, U.S. Pat No. 5,326,216; Curten, U.S. Pat. No. 5,336,037, Weller, U.S. Pat No. 5,350,271; Wern, Canadian Pat. No. CA 2069809-A; and Jones, UK Pat. App. GB 2 238 290 A.

Wheel-lift tow trucks were introduced to minimize the potential for damage caused by crane and hook or sling type tow vehicles. These early model tow trucks became ineffective at safely and reliably towing newer model automobiles due to lower chassis heights, new bumper designs and air-dams. Various of the above mentioned prior art references, however, still exhibited limitations such as inability to utilize the truck's rear deck, potential damage to the automobile by engagement with the wheel grid and/or the main boom (this is more prevalent with vehicle designs exhibiting a substantial overhang of the body or chassis beyond the front and/or rear axle), lack of sufficient maneuverability of the main and wheel booms for tow positioning, and tipping of the tow truck due to the weight of the vehicle in tow. Shoup et al., U.S. Pat. No. 4,797,057, provides a wheel lift type tow truck, having an extensible main boom and a motor and linkage for raising and lowering the main boom, which fully addresses these limitations, and is incorporated by reference herein.

The prior art also lacks efficient safety or locking mechanisms for securing the towed vehicle within the wheel grid. With the hydraulic actuator configuration of Capers, supra, for example, a loss of hydraulic power would release the wheel supports (lift arms in the present invention) and enable the vehicle in tow to disengage from the lateral extension assembly (wheel grid in the present invention), and drop from the tow vehicle. The employment of a safety locking mechanism would be essential to guard against this dangerous potential.

Some references employ various types of locking mechanisms which, however, fail to achieve the advantages of the present invention. Carey, supra, discloses a manually operable latch means with a spring biased, slidable latch bolt which when in a locked position engages a notch in an adjacent pivot plate and thereby locks the wheel restraint assembly. Additionally, Nespor, supra, employs a pin lock which utilizes a pin inserted through a hole in a shoe at the end of the cross bar (wheel boom) which engages one of several notches in the tire retaining member (lift arm) and thereby locks the retaining member in place around the tire. Such locking mechanisms, however, unlike the present invention, require manual engagement, adding extra steps to the towing procedure and introducing additional human error into the safety of the towing process.

The present invention overcomes these limitations by providing an over-center locking mechanism which automatically secures the wheel engaging arms of the wheel grid in place without the assistance of the actuating mechanisms (hydraulic cylinders, screw drives, or the like). This over-center locking mechanism requires no manual engagement or extra steps beyond the normal procedure for engaging, lifting and towing the target automobile. Engagement of the lift arms and wheel boom with the wheels of the vehicle to be towed automatically sets the over-center locking mechanism without the continued support of the linear actuators. The present invention further provides a reverse tilt lock or position lock which may serve as either a back-up or primary security system. The position lock, like the over-center lock, is automatic and requires no manual engagement.

The present invention further provides a wheel spacer which adapts the wheel boom for smaller sized wheels and flat tires. The wheel spacer adjusts the space between the parts of the wheel grid which engage the wheel of the vehicle to be towed. This wheel spacer engages wheels of varying sizes more efficiently than wheel grids disclosed in the prior art. The wheel spacer also positions the wheels of the vehicle in tow in a manner producing maximum ground clearance and maximum clearance between the underside of the vehicle in tow and the wheel grid itself. These increased clearances reduce the risk of damage to the vehicle during the towing process.

BRIEF SUMMARY OF THE INVENTION

The tow truck of the present invention includes a truck chassis with a bed frame made up of spaced frame members, and a deck assembly situated upon the bed frame. Attached to the end of a main boom is a wheel grid assembly for engaging either the front or rear wheels of the vehicle to be towed. The wheel grid assembly of the present invention includes a wheel boom pivotally connected to the outer end of the main boom, and inclined surfaces at each end of the wheel boom for engagement with an automobile wheel. A pair of lift arms extend rearwardly from the wheel boom, and generally perpendicular thereto. Each lift arm is comprised of an extension arm segment and an engaging arm segment which is pivotally connected to the end of the extension arm segment, remote from the wheel boom.

Linear actuators, such as hydraulic cylinders, are provided for moving the engaging arm segments into a wheel engaging position for lifting an end of the vehicle to be towed. Each linear actuator connects to an over-center locking mechanism for locking the engaging arm segment in a wheel-engaging position, and thereby locking the engaging arm segment without aid of force from the linear actuator.

The over-center locking mechanism consists of a linkage apparatus whereby full extension of the linear actuator positions the linkage apparatus in a locking position, such that outward pressure by the wheel against the engaging arm segment forces said linkage apparatus in the direction of the locking position. The linear actuator specifically connects to an actuating link having one end pivotally attached to the lift arm's extension arm segment and the other end pivotally attached to one end of a connecting link. The other end of the connecting link is then pivotally attached to the lift arm's engaging arm segment. This linkage is configured such that full extension of the linear actuator positions the pivot point between the actuating link and the connecting link beyond 180 degrees (over-center) so that outward pressure by the wheel against the engaging arm segment forces the linkage apparatus in the direction of the locking position.

The present invention further provides an automatic linear actuator control line retractor assembly and a wheel grid self-centering device. The control line retractor assembly is attached to the telescopic main boom and automatically draws in the linear actuator control lines during retraction of the main boom. The control line retractor assembly consists of a pulley, a connecting cable and a spring loaded dispensing reel which enables automatic retraction of the linear actuator control lines during retraction of the telescopic main boom. The wheel grid self-centering device consists of a spring mechanism which places tension on the wheel boom which forces the wheel grid towards a transverse position with respect to the main boom.

The present invention further provides a position lock mechanism with a switch such that when the wheel grid is in a raised or towing position the switch is in a non-depressed or open position preventing actuation of the linear actuators. Consequently, with the main boom in a raised or towing position, the lack of power to the linear actuators locks the engaging arm segments in a closed or wheel-engaging position. When the main boom is lowered to a loading position, the switch is depressed or closed which permits the flow of power to the linear actuators.

Additionally, the present invention includes a wheel spacer with a wheel engaging surface and pins for attaching the wheel spacer to the wheel grid. The wheel spacer also includes a spring loaded latching pin, extending through the right and left edges of the wheel spacer and a gripping means at one end. A spring located just inside the edge of the wheel spacer forces the latching pin through a hole in the extension arm segment and latching the wheel spacer in place. The wheel spacer adjusts the size of the lift arm to accommodate variations in wheel size and flat tires.

The present invention provides advantages over the prior art by using an over-center locking mechanism which automatically locks the wheels, of a vehicle in tow, within the lift arms of the wheel grid without the aid of force from the linear actuators. The invention thereby provides a safety mechanism which, in the event of a failure of the linear actuators, the vehicle in tow will remain locked in place on the wheel grid. The present invention further improves over the prior art by teaching an alternative position locking mechanism, which may be employed as either a primary lock, or as a secondary safety system in addition to the over-center locking mechanism. Additionally, the present invention discloses a wheel spacer which improves over the prior art by adding adjustability to accommodate wheels of varying sizes, including flat tires, and maximizes ground clearance, and the clearance between the vehicle and the wheel grid which, reduces the risk of damage to the vehicle in tow.

DESCRIPTION OF THE PREFERRED EMBODIMENTS

Figure 1:
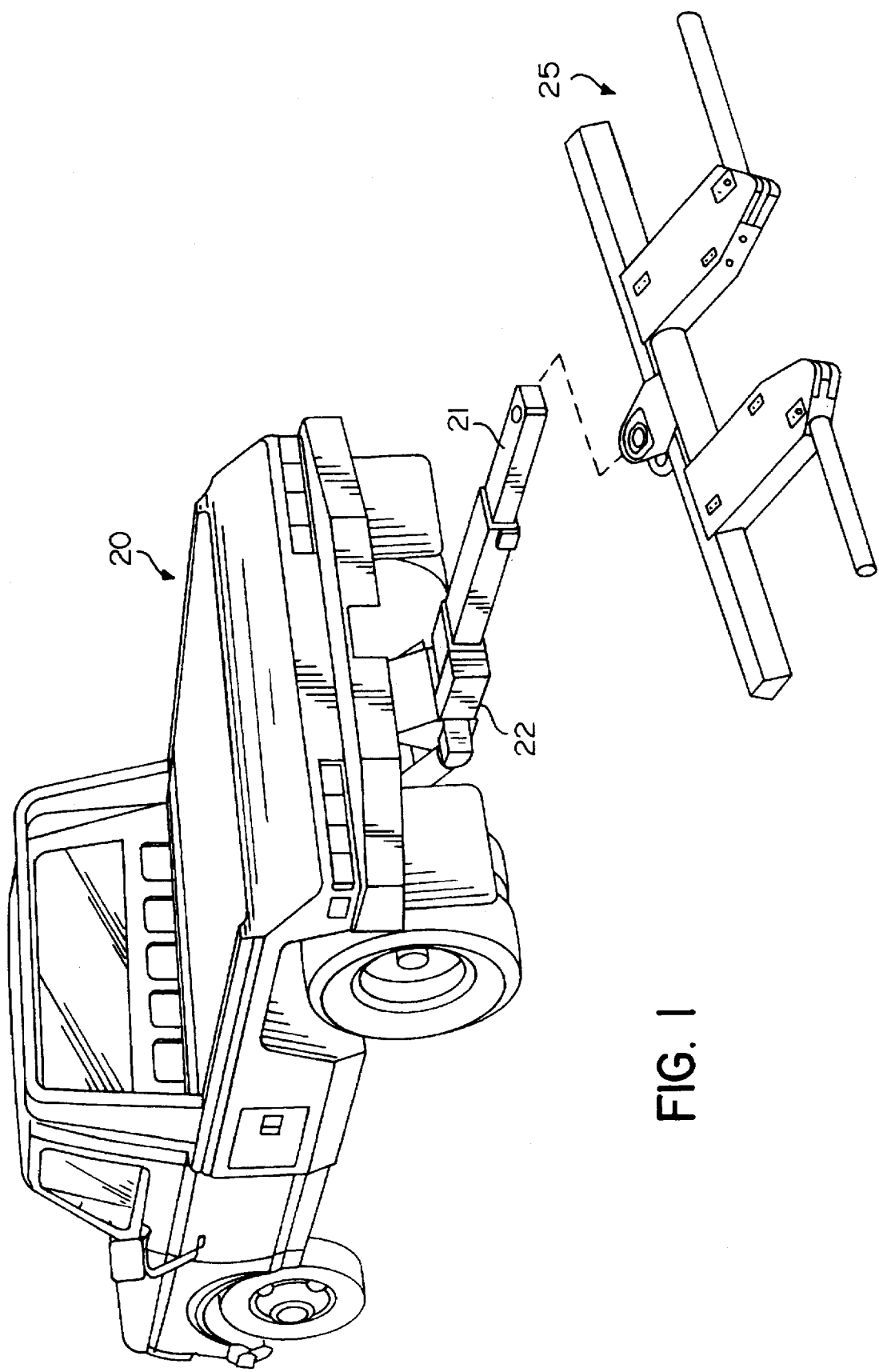
FIG. 1 is an isometric view of a tow truck incorporating the wheel grid of the present invention.
Figure 2:
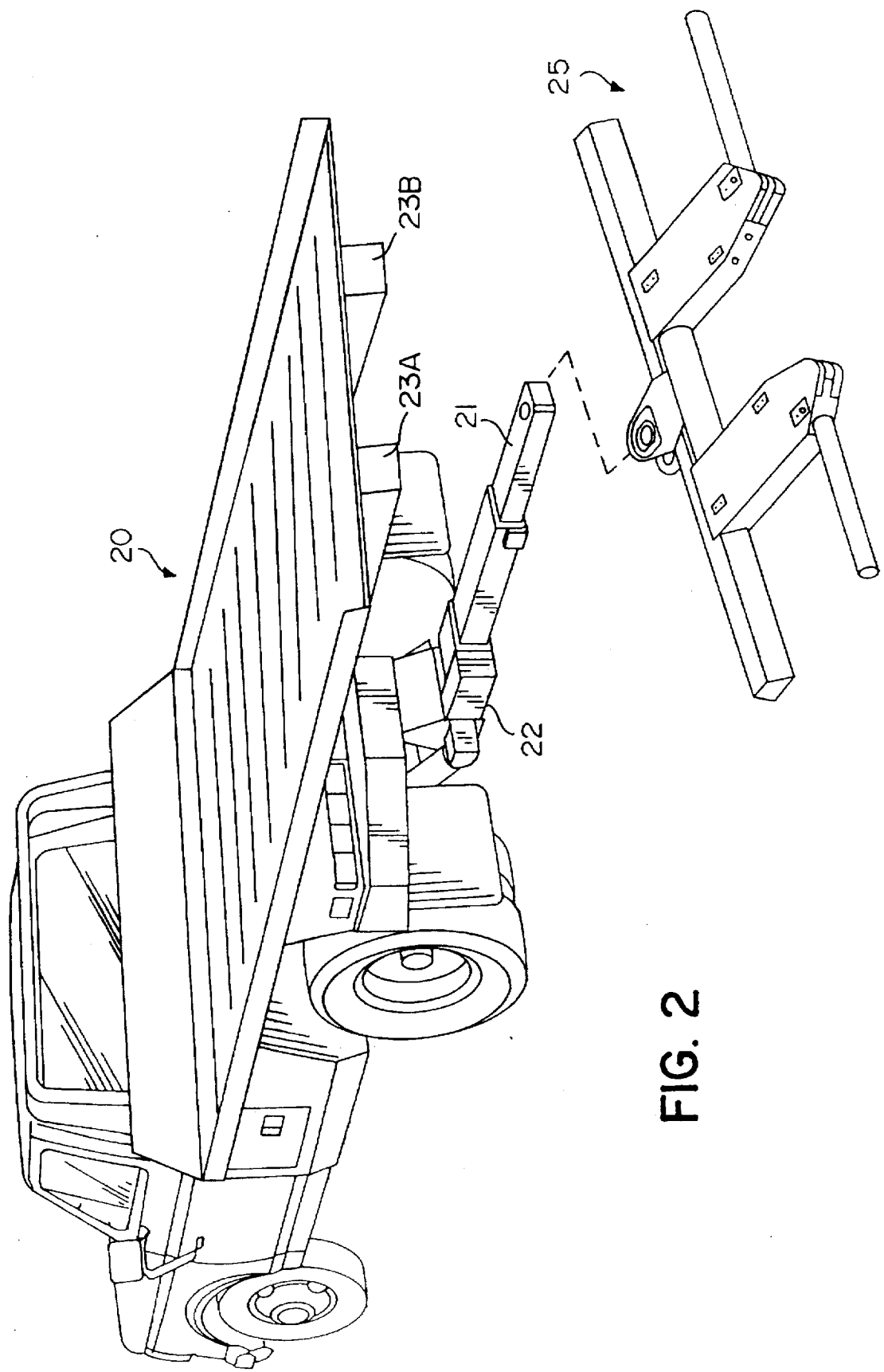
FIG. 2 is an isometric view of a car carrier in accordance with the present invention and incorporating the wheel grid of the present invention.
Figure 3:
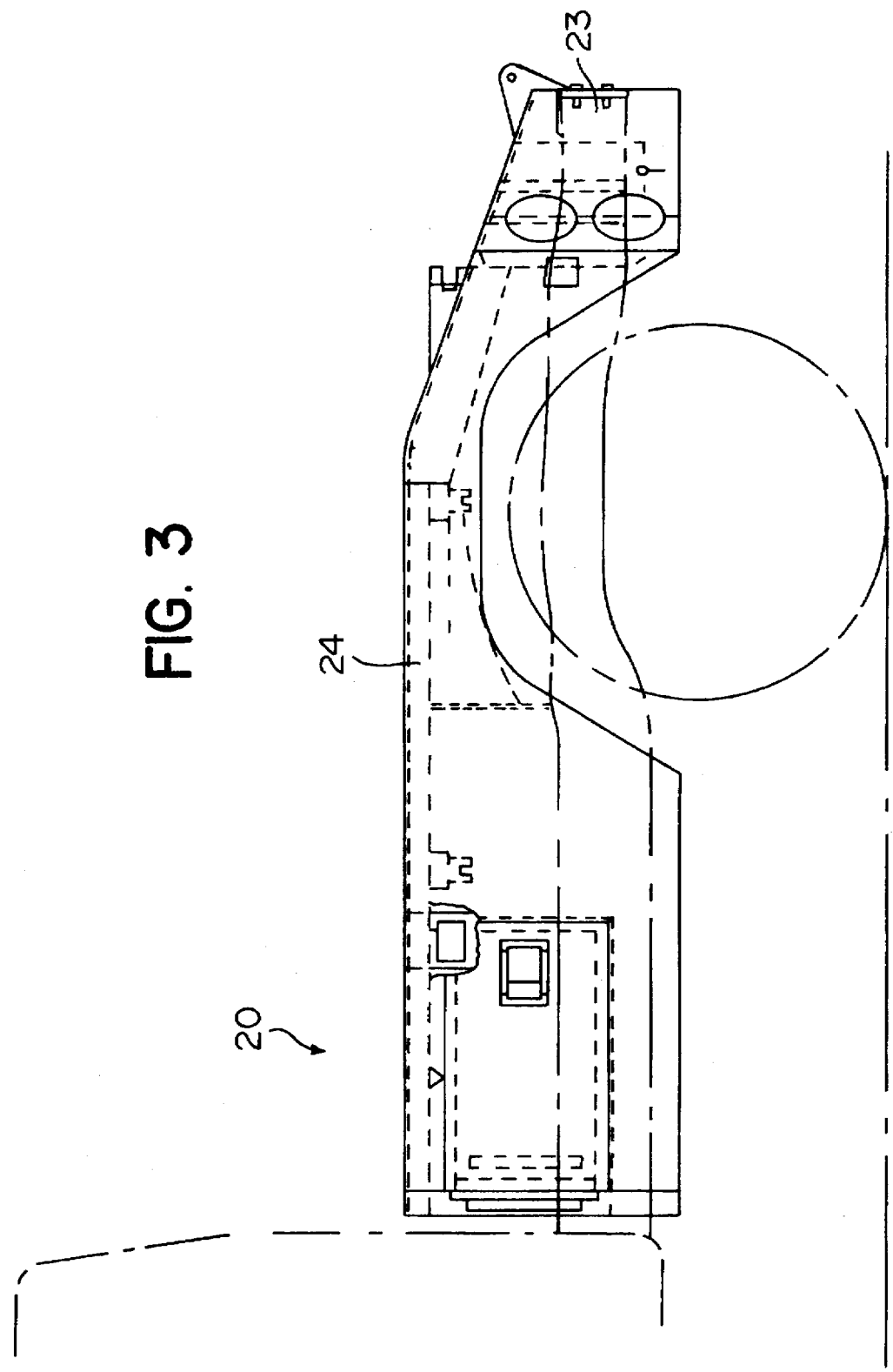
FIG. 3 is a detailed partial side view of a tow truck chassis.
Figure 4:
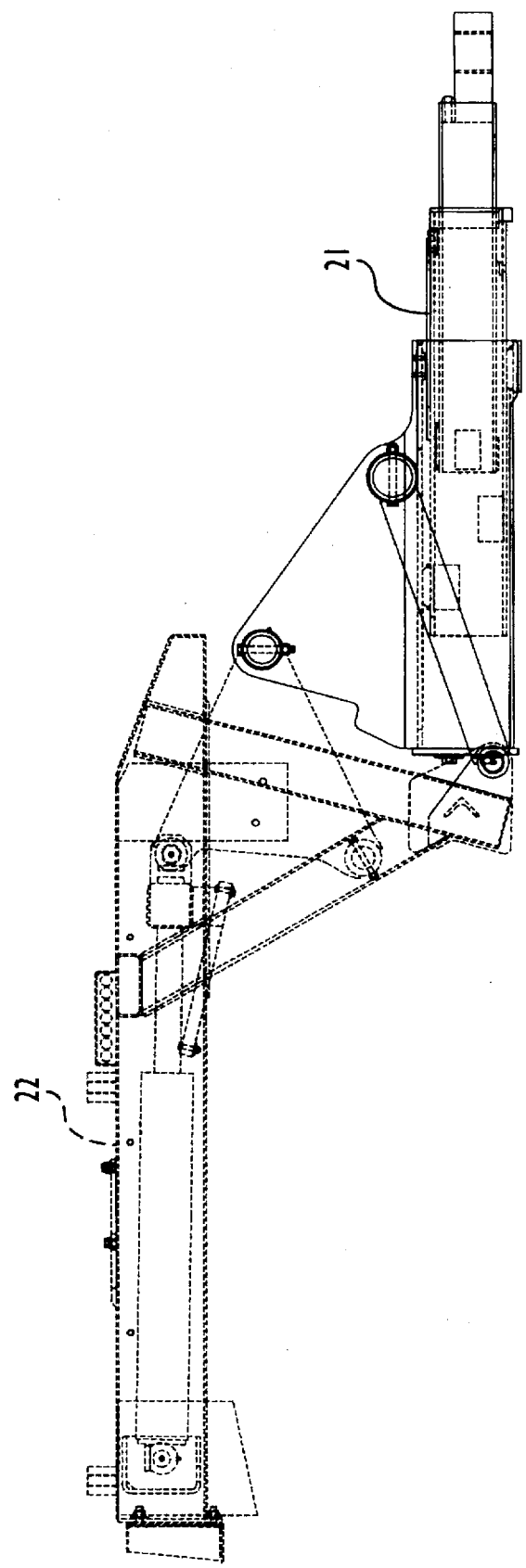
FIG. 4 is a detailed side view of a tow assembly for attachment to a tow truck attached to an extendible boom.
Figure 5:
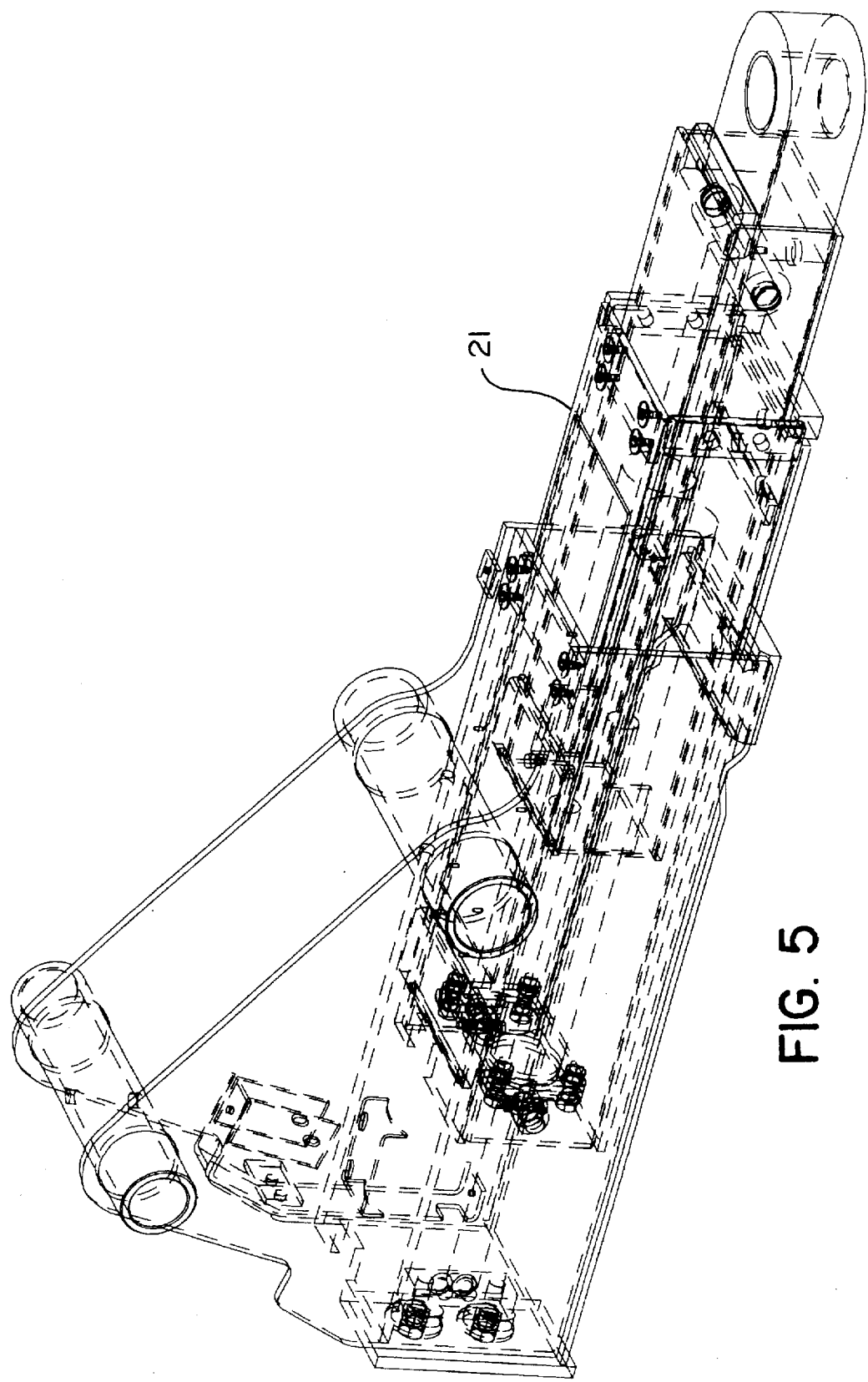
FIG. 5 is an isometric view of an extendible boom.
Figure 8:
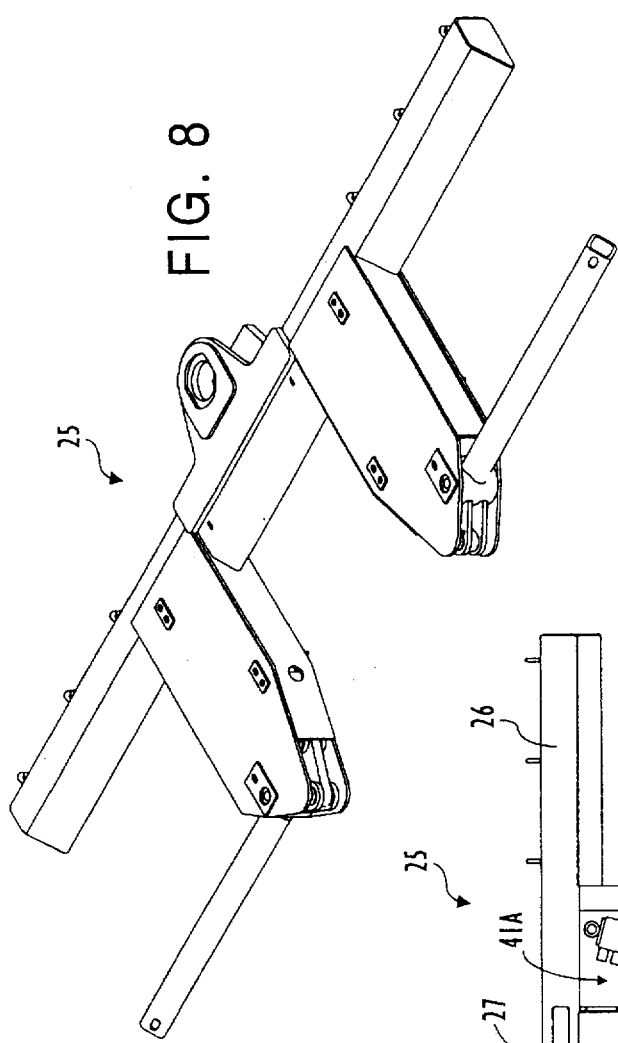
FIG. 8 is an isometric view of FIG. 5, depicted with a top plate covering the over-center locking mechanism within the extension arm segment of a lifting arm.

Referring now to the drawings, wherein like or corresponding reference numerals are used for like or corresponding parts throughout the several views, there is shown in FIGS. 1 and 2, a wheel-lift type of tow truck 20 having an extensible telescopic main boom 21 and a tow assembly 22, including a motor and linkage, for raising and lowering the main boom 21. The tow truck 20 of the present invention includes a truck chassis, shown in FIG. 3, with a bed frame 23 made up of spaced frame members 23A and 23B, and a deck assembly 24 situated upon the bed frame 23. The tow assembly 22 is shown in FIG. 4 attached to the main boom 21. FIG. 5 shows the main boom 21. Attached to the end of the main boom 21 is a wheel grid assembly 25 for engaging either the front or rear wheels of the vehicle to be towed.

Figure 6:
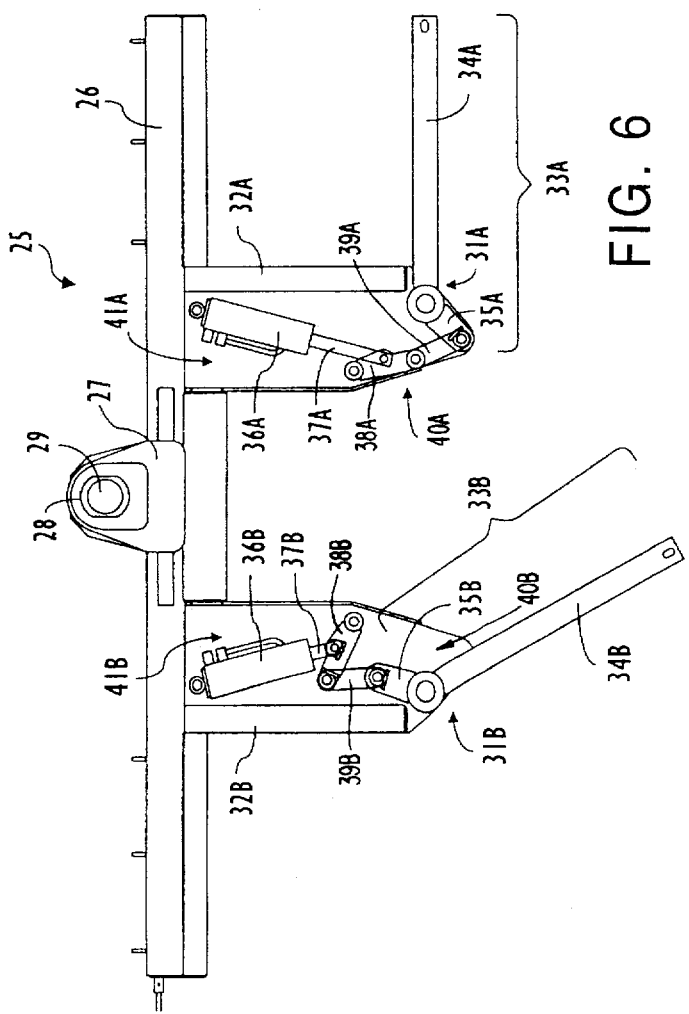
FIG. 6 is a top view of a preferred embodiment of a wheel grid in accordance with the present invention.

Referring now to FIG. 6, there is shown a wheel grid assembly 25 in accordance with the present invention. In this first embodiment the wheel grid assembly 25 includes the wheel boom 26 having, at the center thereof, a forwardly extending mount bracket 27 in the center of which there is the bearing 28; a pin 29, serves to pivotally connect the wheel boom 26 to the bearing 28, thereby pivotally connecting the wheel grid assembly 25 to the main boom 21 for movement through substantially 180 degrees.

The lift arms 31A and 31B each include extension arm segments 32A and 32B, extending rearwardly and perpendicularly to the wheel boom 26. The engaging arm segments 33A and 33B are pivotally connected at the rear or outer ends, remote from the wheel boom 26, of the extension arm segments 32A and 32B. The engaging arm segments 33A and 33B consist of actuating arm segments 35A and 35B and gripping arm segments 34A and 34B, respectively, extending in different directions from the pivot points of the engaging arm segments 33A and 33B. The engaging arm segments 33A and 33B form pivoting arms which are pivotally connected to over-center locking mechanisms 40A and 40B at the end of the actuating arm segments 35A and 35B.

The engaging arm segments 33A and 33B are pivoted by actuation of linear actuators 41A and 41B. The linear actuators 41A and 41B consist of fixed arm segments 36A and 36B and movable arm segments 37A and 37B, respectively. One end of the fixed arm segment 36A and one end of the fixed arm segment 36B are pivotally attached to the extension arm segments 32A and 32B, respectively, and the movable arm segments 37A and 37B extend through the opposite end of the fixed arm segments 36A and 36B, respectively. The ends of the movable arm segments 37A and 37B not extending through the fixed arm segments 36A and 36B are pivotally attached to the over-center locking mechanisms 40A and 40B. The linear actuators 41A and 41B are powered such that extension of the movable arm segments 37A and 37B rotate the engaging arm segments 33A and 33B about their pivot points, from an open position (non-engaging position), illustrated by the left lift arm 31B of FIG. 6, to a closed position (wheel-engaging position), illustrated by the right lift arm 31A of FIG. 6.

The linear actuators 41A and 41B maneuver the lift arms 31A and 31B between the open and closed positions and automatically lock the lift arms 31A and 31B, when in the closed position, through the over-center locking mechanisms 40A and 40B. The over-center locking mechanisms 40A and 40B consist of linkage apparatus whereby full extension of the linear actuators' movable arm segments 37A and 37B positions the linkage apparatus in a locking position, such that outward pressure by the wheels against the engaging arm segments 33A and 33B forces the linkage apparatus toward the locking position. The locked or wheel engaging position is therefore automatically maintained without the aid of the linear actuators 41A and 41B.

Figure 7:
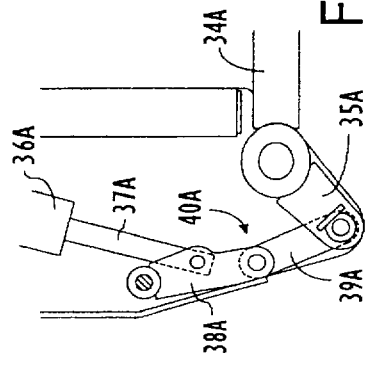
FIG. 7 is a detailed top cut-away view of the over-center locking mechanism of the present invention, depicted in its locked position.

In this first embodiment, as illustrated in FIGS. 6 and 7, the linear actuators specifically connect to actuating links 38A and 38B, having one end pivotally attached to the lift arms' extension arm segments 32A and 32B and the other end pivotally attached to one end of connecting links 39A and 39B, respectively. The other end of the connecting links 39A and 39B are then pivotally attached to the lift arms' engaging arm segments 33A and 33B, respectively. These linkages are configured such that full extension of the linear actuators' movable arm segments 37A and 37B rotate the linkage apparatus to a position where the pivotal joint between the actuating links 38A and 38B and the connecting links 39A and 39B, respectively, are situated at or beyond their 180 degree points (over-center). Consequently, outward pressure by the wheels against the engaging arm segments 33A and 33B forces the linkage apparatus of the over-center locking mechanisms 40A and 40B toward their locked positions. The locked or wheel-engaging position is therefore automatically maintained without the aid of the linear actuators 41A and 41B.

In the closed or engaging position, the over-center locking mechanisms 40A and 40B automatically obtain locked positions whereby release of the engaging arm segments 33A and 33B cannot occur without linear actuation. In other words, to release the engaged wheels of the vehicle in tow, the linear actuators 41A and 41B must be powered to retract the movable arm segments 37A and 37B which thereby unlocks the over-center locking mechanisms 40A and 40B and rotates the engaging arm segments 33A and 33B to the aforementioned open position.

Figure 9:
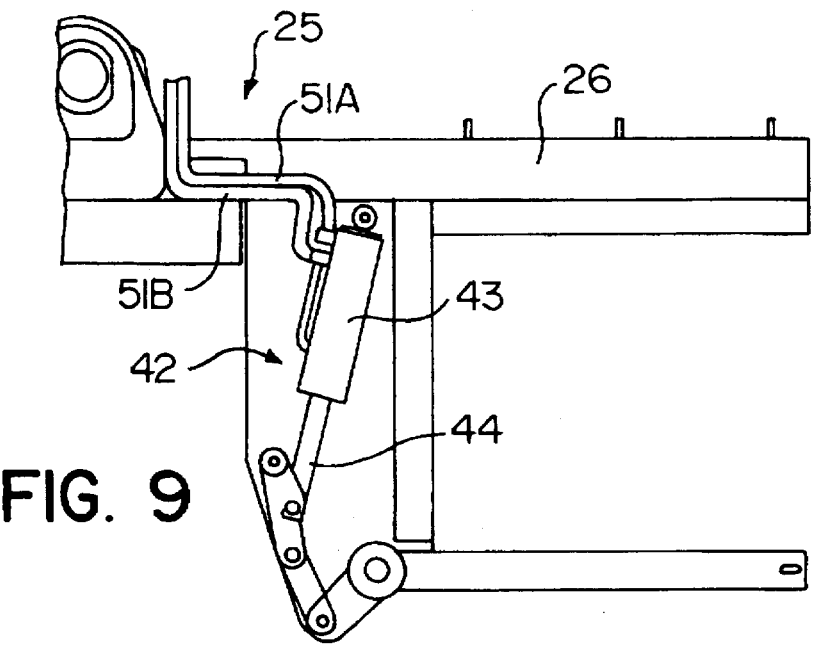
FIG. 9 is a detailed top cut-away view of the hydraulic cylinder linear actuator.

Variations of the above described embodiments are possible. For example, the linear actuators may consist of a number of different linear control devices. One configuration, as illustrated in FIG. 9, may employ a hydraulic cylinder 42 as the linear actuators 41A and 41B. Each hydraulic cylinder 42 would consist of a hydraulic bushing 43 (fixed arm segment) and a hydraulic piston 44 (movable arm segment). The hydraulic cylinders 42 operate from a pressurized hydraulic system commonly known to those skilled in the art. Hydraulic fluid within the hydraulic bushing 43 actuates the hydraulic piston 44 through variation of the hydraulic fluid pressure. The hydraulic fluid flows through linear actuator control lines 51A and 51B. The embodiment utilizing the hydraulic cylinders 42 would be configured with respect to the entire wheel grid assembly 25 as described above.

Figure 10:
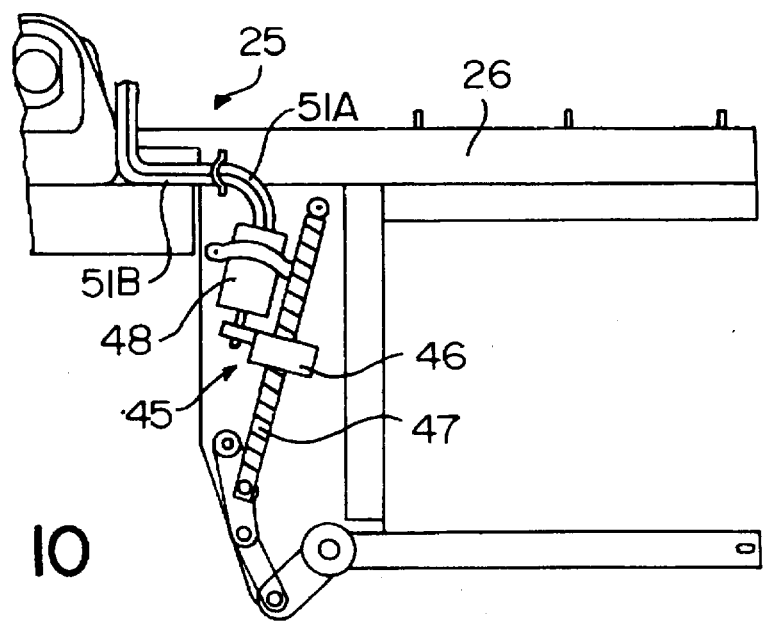
FIG. 10 is a detailed top cut-away view of the screw drive linear actuator.

In another variation of the present invention, as illustrated in FIG. 10, the linear actuators 41A and 41B could consist of linear screw drives 45. Each screw drive 45 would consist of a threaded bushing 46 (fixed arm segment) and a threaded shaft 47 (movable arm segment). The screw drive 45 employs an electric motor 48 for actuation by spinning the threaded bushing 46, which in turn either extends or retracts the threaded shaft 47 depending on the spin direction. The electric motor 48 is powered through linear actuator control lines 51A and 51B. The embodiment utilizing the screw drives 45, would be configured with respect to the entire wheel grid assembly 25 as described above.

Figure 12:
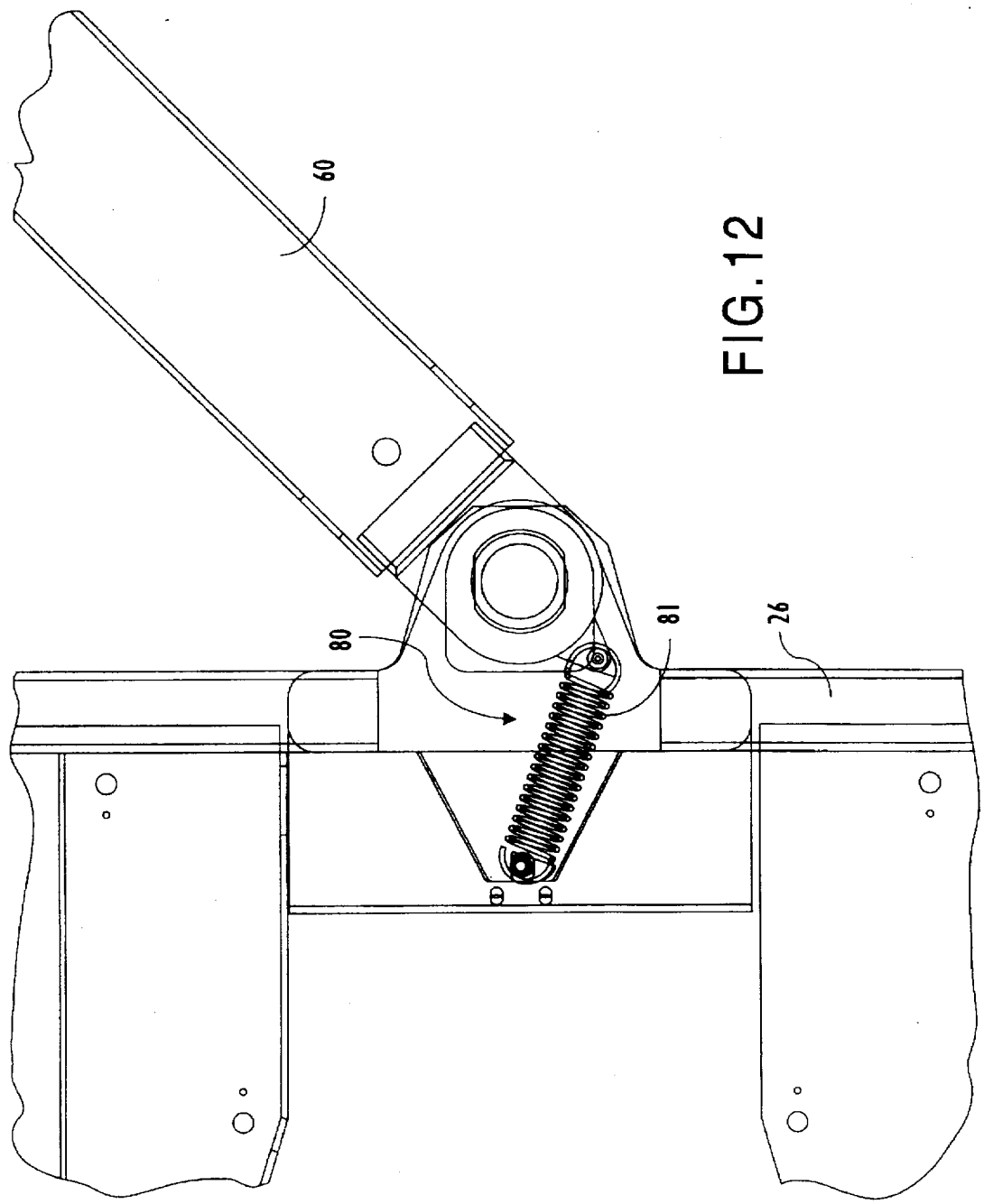
FIG. 12 is a top cut-away view of the wheel grid self-centering device.
Figure 13:
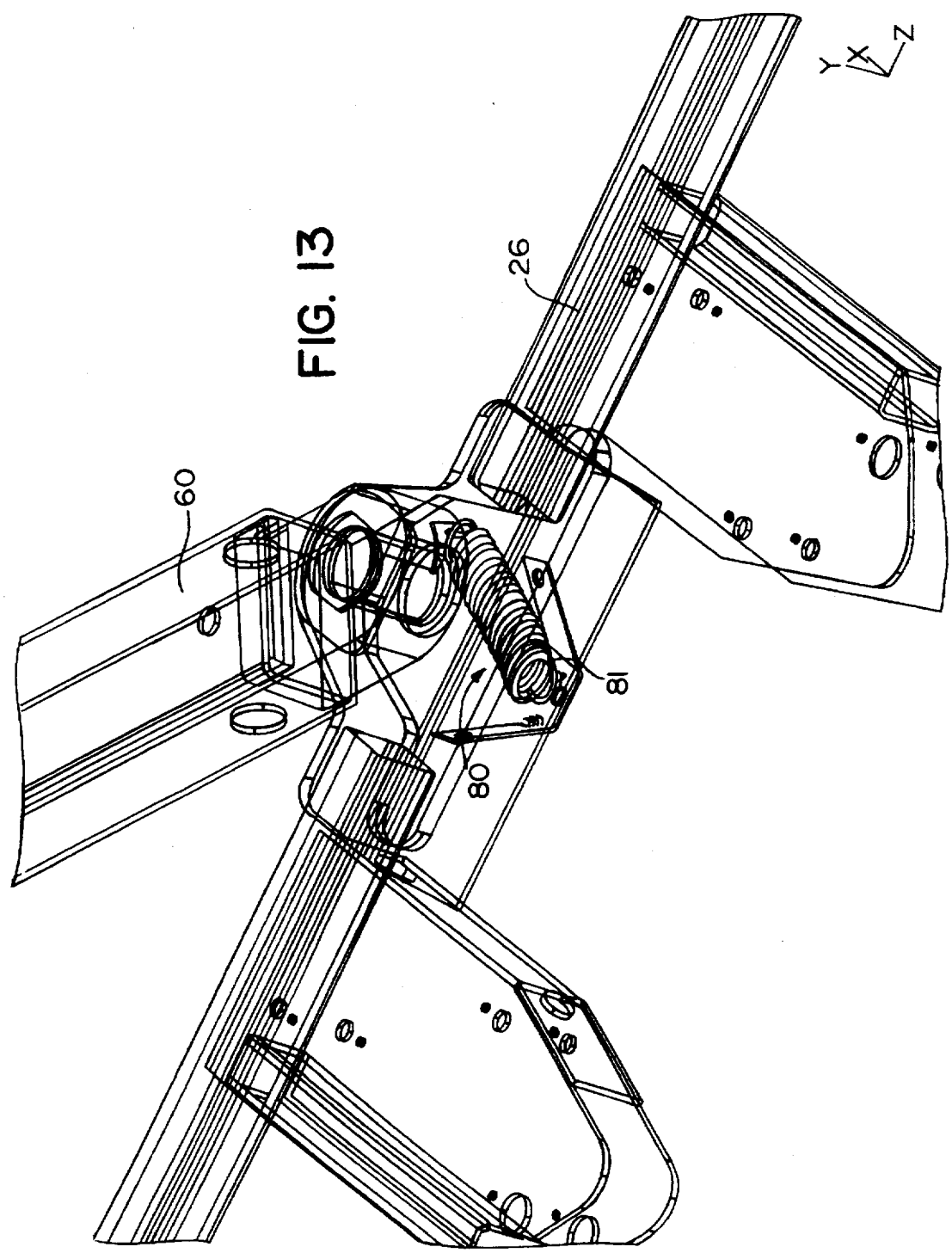
FIG. 13 is an isometric view of the wheel grid self-centering device.

Referring now to FIGS. 12 and 13, another variation of the present invention discloses a wheel grid self-centering mechanism 80. The wheel grid self-centering mechanism 80 consists of a spring 81 with one end attached to the telescoping end of the main boom 21, and the other end centrally attached to the wheel boom 26. Rotation of the wheel grid 25 stretches the spring 81 and creates a tension force drawing the wheel grid 25 towards its center or transverse position with respect to the main boom 21. The positioning of the wheel grid 25 will consequently be biased towards its center or transverse position with respect to the main boom 21.

Figure 11:
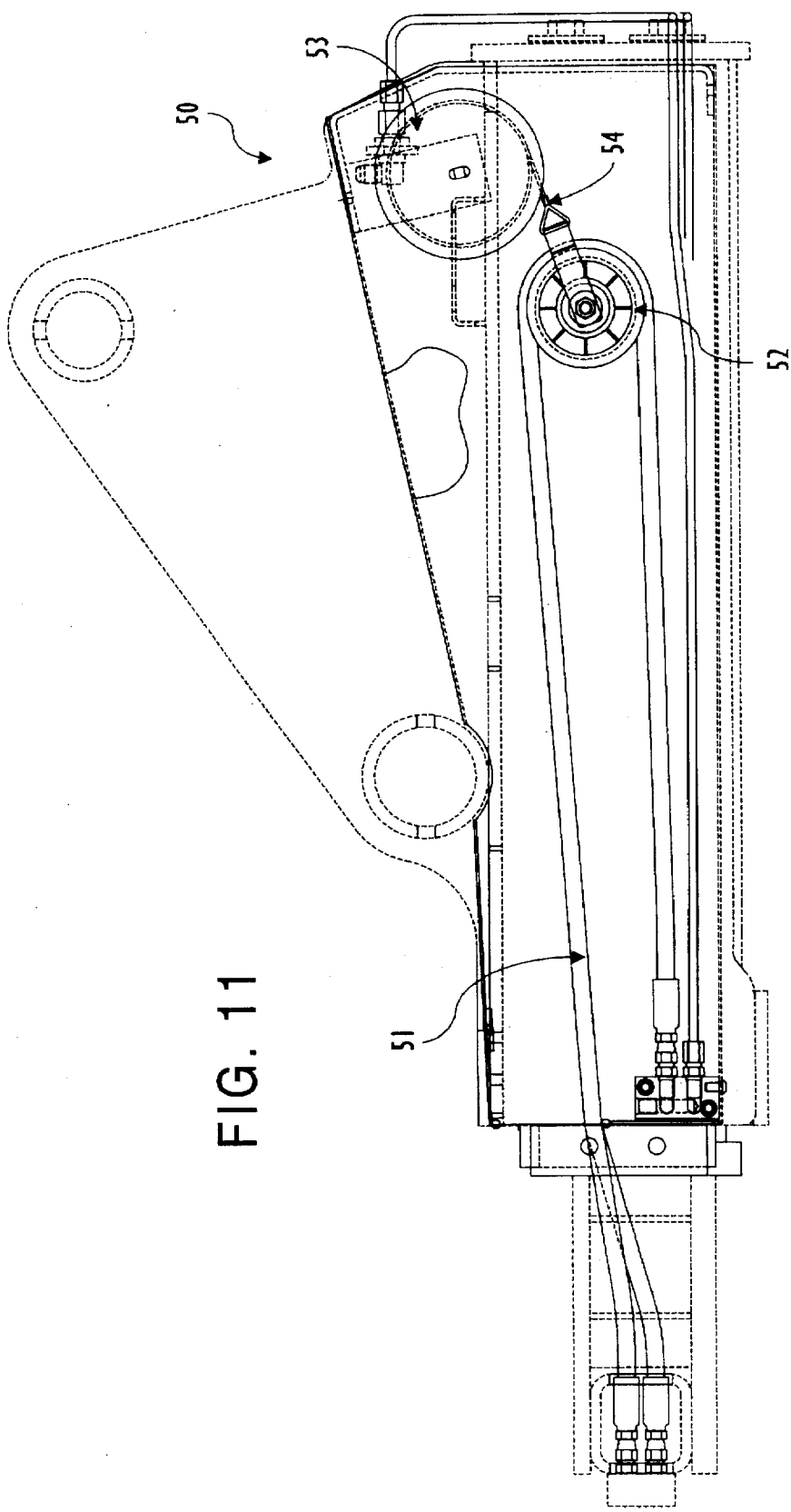
FIG. 11 is a detailed side view of the automatic linear actuator control line retractor assembly.

In yet, a further variation of the present invention, as illustrated in FIG. 11, an automatic linear actuator control line retractor assembly 50 is disclosed. This control line retractor assembly 50 attaches to the telescopic main boom 21, and automatically draws in the linear actuator control lines 51A and 51B. The control line retractor assembly 50 consists of a pulley 52 attached, via a connecting cable 54, to a spring loaded dispensing reel 53. The spring loaded dispensing reel 53 is in turn attached to the main boom 21. In operation, as the telescopic main boom 21 is extended the linear actuator control lines 51A and 51B drag the pulley 52 in the direction of the extension of the main boom 21, which in turn draws the connecting cable 54 out from the spring loaded dispensing reel 53. Then as the main boom 21 is retracted, the connecting cable 54 is reeled in through the recoil action of the spring loaded dispensing reel 53, which in turn draws the pulley 52 and the linear actuator control lines 51A and 51B back in the direction of the retracting main boom 21.

Figure 14:
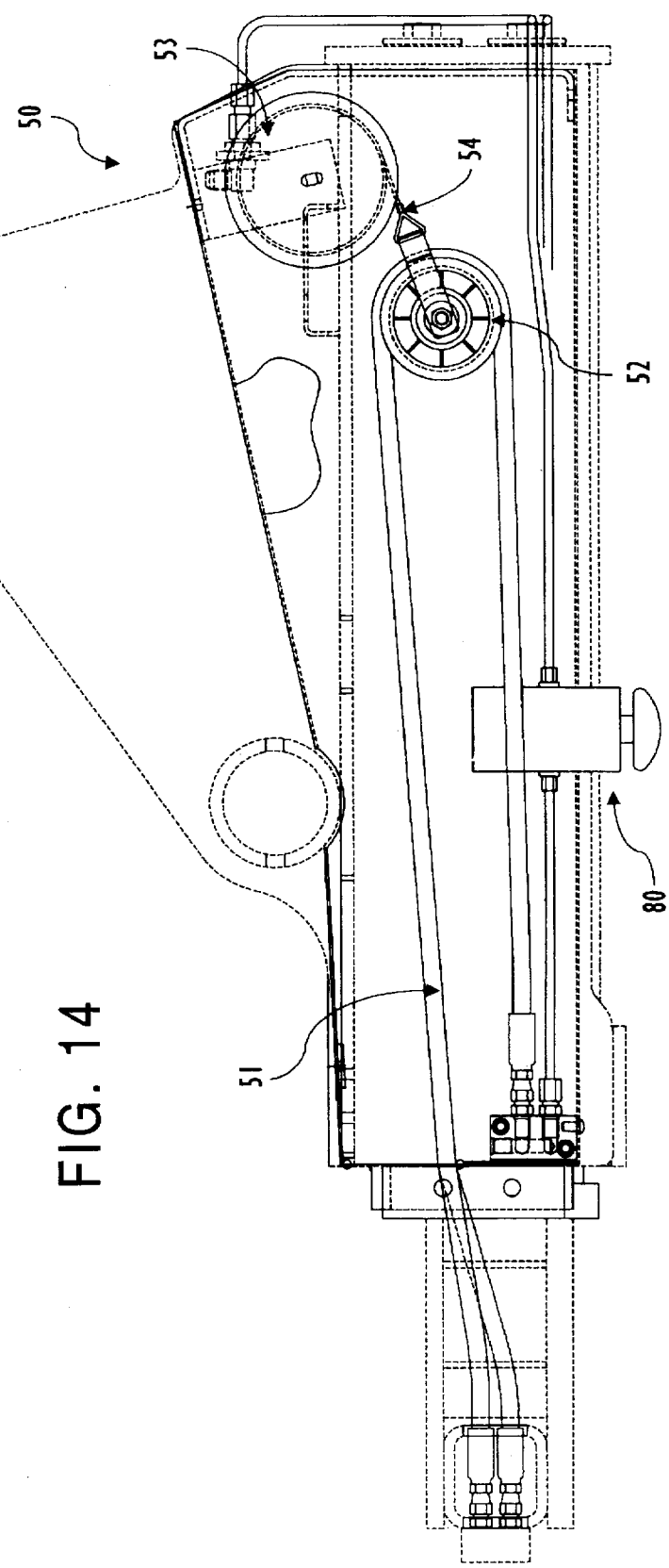
FIG. 14 is a detailed side view of the automatic linear actuator control line retractor assembly with the grid lock-out switch.
Figure 15:
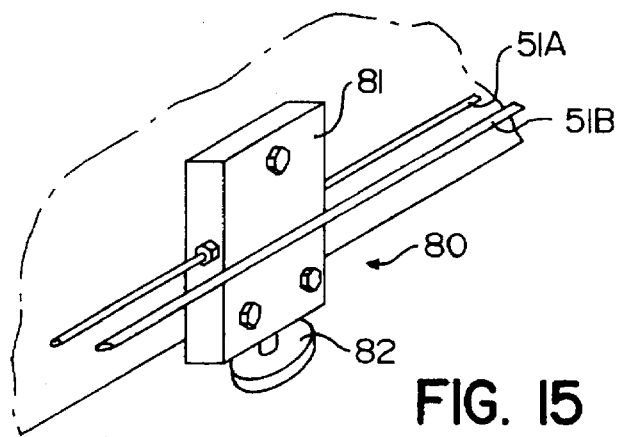
FIG. 15 is a detailed view of the grid lock-out switch.
Figure 16:
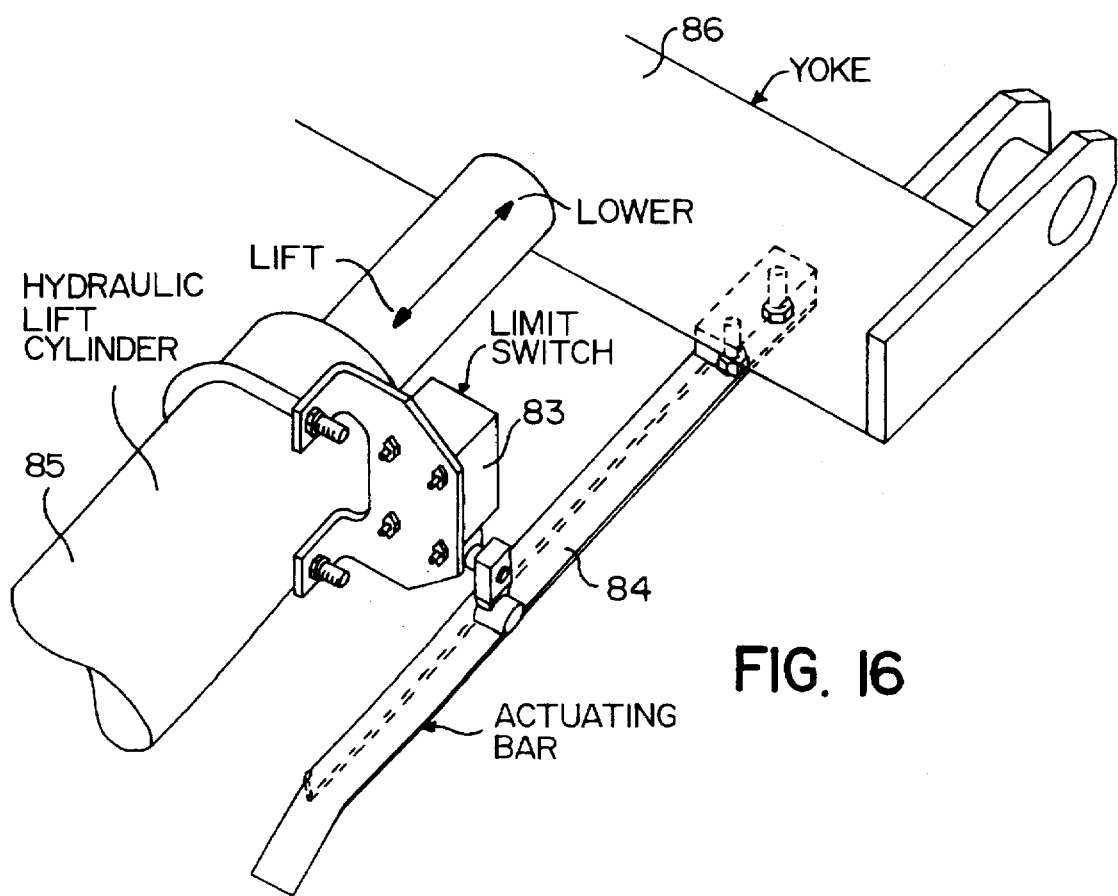
FIG. 16 is a detailed view of the limit switch and actuating bar.

In yet an additional variation, the present invention discloses a position lock mechanism 80, as illustrated in FIGS. 14, 15 and 16, whereby the engaging arm segments 33A and 33B are either locked or unlocked depending upon the position of the wheel grid assembly 25. This mechanism locks the engaging arm segment 33, in a locked or wheel-engaging position while the wheel assembly 25 is in a raised or lifting position. The position lock mechanism 80 may be employed as either the primary locking mechanism or as a back-up or secondary locking mechanism in addition to the over-center locking mechanism.

One embodiment of the position lock mechanism 80, as depicted in FIG. 15, consists of a grid lock-out switch 81 with an actuating button 82. The grid lock-out switch is located in one of the linear actuator control lines and regulates the actuation of the linear actuators 41A and 41B based on the position of the main boom 21. When the main boom 21 is in a raised or towing position, the grid lock-out button 82 is in a non-depressed or open position and power to the linear actuators 41A and 41B is cut-off. The grid lock-out switch may comprise a number of different configurations depending on the type of linear actuators 41A and 41B utilized. One configuration may consist of a mechanical valve wherein the open position obstructs the flow of hydraulic fluid to the hydraulic cylinder linear actuators 42. Another configuration could consist of an electrical switch wherein the open position cuts off electrical power to the screw drive linear actuators 45. Consequently, with the main boom 21 in this raised or towing position, the lack of power to the linear actuators 41A and 41B locks the engaging arm segments 33A and 33B in a locked or wheel engaging position. When the main boom 21 is lowered to a loading position, the ground depresses the actuating button 82 which permits the flow of power to the linear actuators 41A and 41B. The linear actuators 41A and 41B are then operable and the gripping arm segments 33A and 33B may be freely opened and closed as described above.

In an additional embodiment of the position lock mechanism 80, as depicted in FIG. 16, a limit switch 83 is attached to the hydraulic lift cylinder 85. The limit switch 83 is activated by an actuating bar 84 attached to the yoke 86. When the hydraulic lift cylinder 85 is retracted and the main boom 21 is in a raised or towing position, the actuating bar 84 releases the limit switch 83 to an open or non-depressed position which prevents actuation of the linear actuators 41A and 41B (i.e., in the case of hydraulic linear actuators, an open position of the limit switch prevents the control signals from reaching the hydraulic control valves, and in the case of screw drive linear actuators, the open position of the limit switch prevents the control signals from reaching the screw drive). Consequently, with the main boom 21 in a raised or towing position, the lack of power to the linear actuator controls prevents actuation of the linear actuators 41A and 41B and thereby locks the engaging arm segment 33 in a locked or wheel-engaging position. When the hydraulic lift cylinder 85 is extended and the main boom 21 is in a lowered or loading position, the actuating bar 84 depresses the limit switch 83 which permits actuation of the linear actuators 41A and 41B. The linear actuators 41A and 41B are then operable and the gripping arm segments 33A and 33B may be freely opened and closed as described above.

Figure 17:
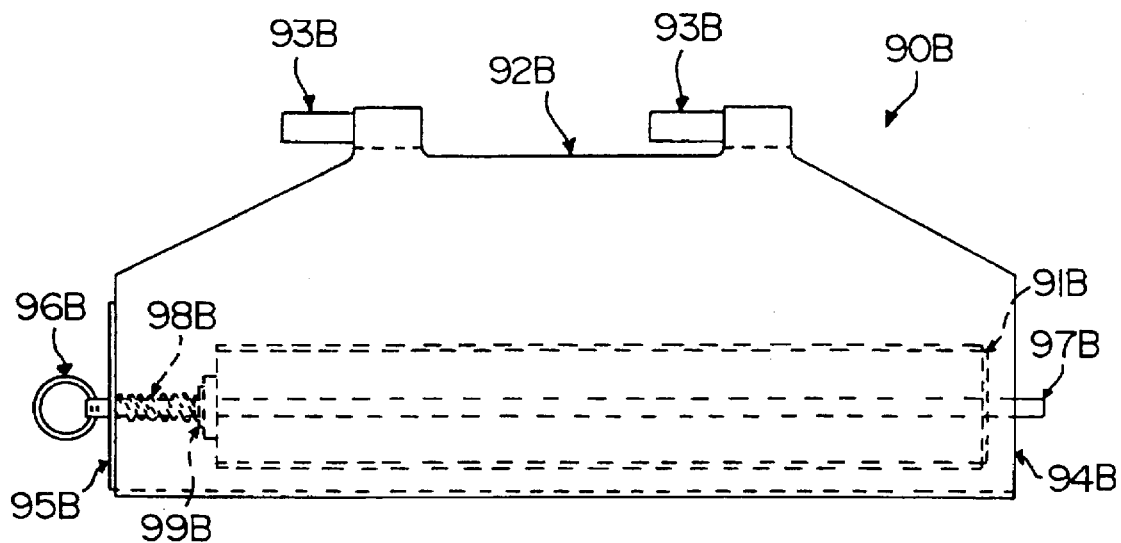
FIG. 17 is a detailed top view of a left wheel spacer.
Figure 18:
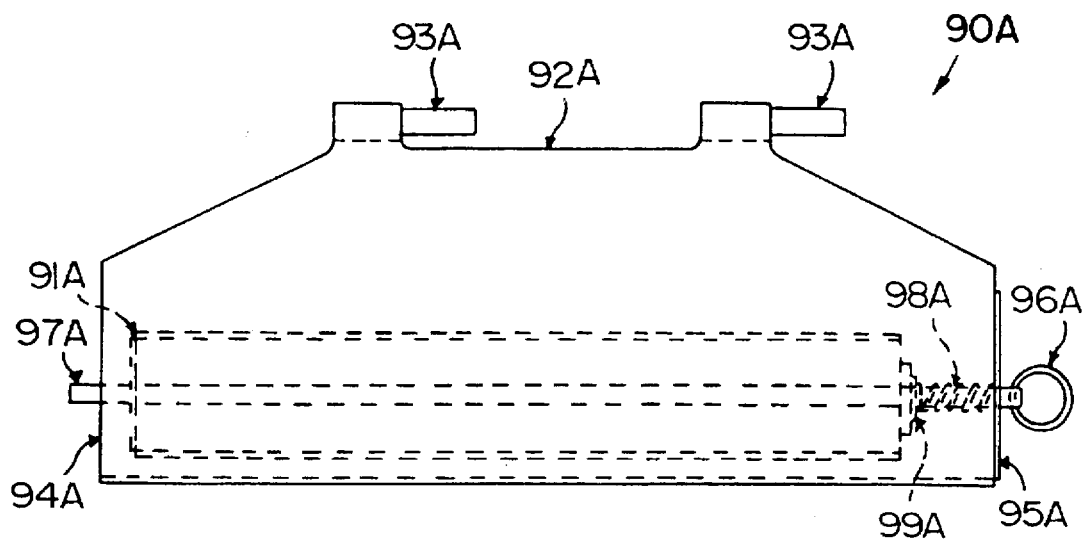
FIG. 18 is a detailed top view of a right wheel spacer.

In yet another embodiment, the present invention provides wheel spacers 90A and 90B, as depicted in FIGS. 17 and 18 (FIG. 17 illustrates a left wheel spacer 90B and FIG. 18 illustrates a right wheel spacer 90A), consisting of wheel engaging surfaces 91A and 91B and a top edges 92A and 92B, respectively. Attached to the top edges 92A and 92B, the wheel spacers 90A and 90B contain pins 93A and 93B extending parallel to the top edges 92A and 92B. The pins 93B on the left wheel spacer 90B extend toward the left and the pins 93A on the right wheel spacer 90A extend toward the right as shown in FIGS. 17 and 18, respectively.

The wheel spacers further have right edges 94A and 94B and left edges 95A and 95B. Spring loaded latching pins 97A and 97B extend through both the right and left edges, 94A and 95A of the right wheel spacer 90A and 94B and 95B of the left wheel spacer 90B, respectively, and include gripping means 96A and 96B at one end. The latching pins 97A and 97B protrude beyond both the left and right edges, 94A and 95A of the right wheel spacer 90A and 94B and 95B of the left wheel spacer 90B, respectively, with the gripping means 96B on the left wheel spacer 90B being located at the end of the latching pin 97B protruding through the left edge 95B, and the gripping means 96A on the right wheel spacer 90A being located at the end of the latching pin 97A protruding through the right edge 95A. The latching pins 97A and 97B also include springs 98A and 98B, located just inside the left edge 95B of the left wheel spacer 90B and just inside the right edge 94A of the right wheel spacer 90A. The springs 98A and 98B are locked in place with locking rings 99A and 99B, respectively, with the spring tension forcing the latching pin 97B toward the right and forcing the latching pin 97A toward the left.

Figure 19:
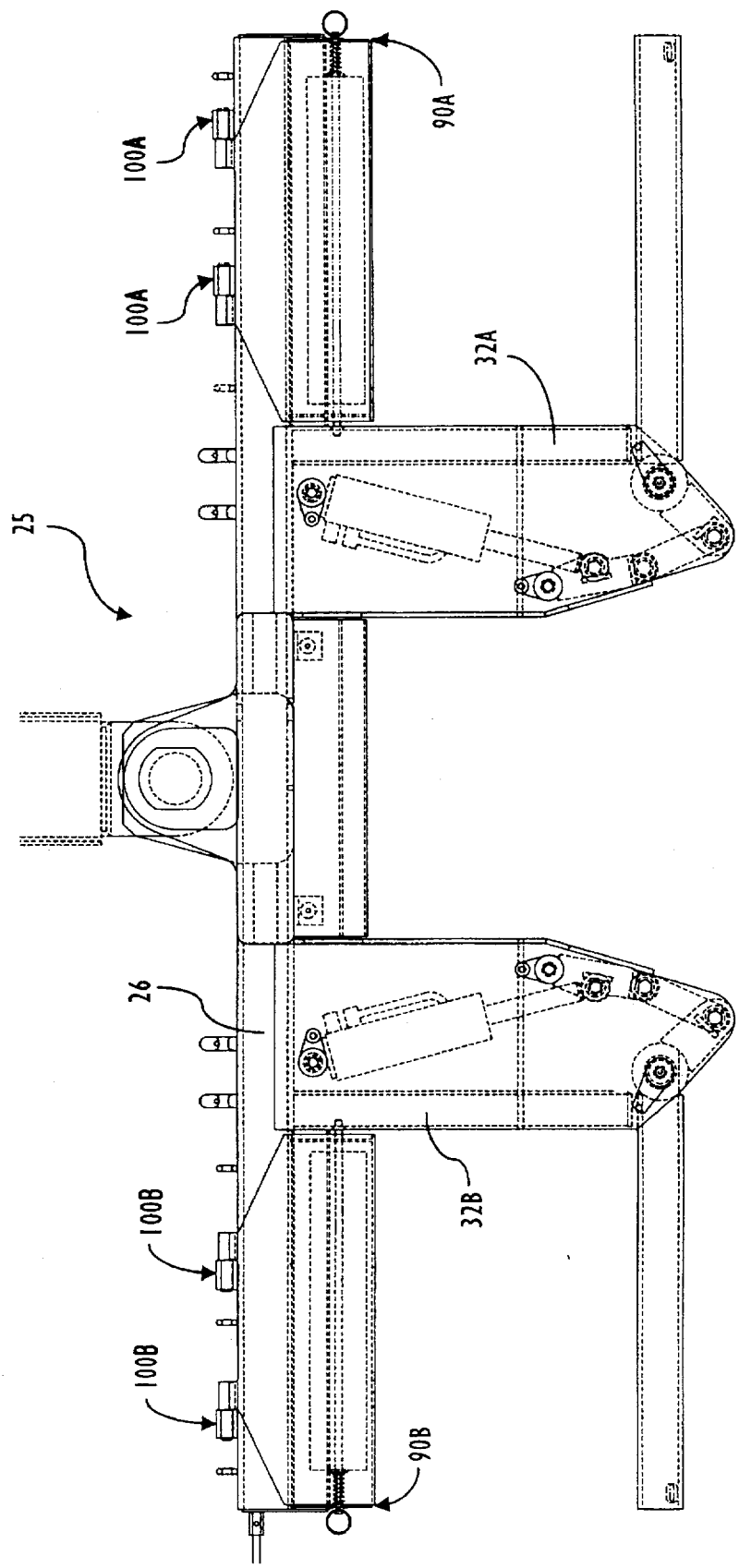
FIG. 19 is a detailed top view of the wheel grid with wheel spacers in place.

Referring now to FIG. 19, the wheel spacers 90A and 90B slip in place by inserting the pins 93A and 93B into the slot rings 100A and 100B on the rear edge of the wheel boom 26. The wheel spacers rotate downward into place and the protruding ends of the spring loaded latching pins 97A and 97B, without the gripping means 96A and 96B, extend through holes in the extension arm segments 32A and 32B, respectively, and latch the wheel spacers 90A and 90B in place. The spring loaded latching pins 97A and 97B merely latch the wheel spacers 90A and 90B in place, while the top surface of the wheel boom 26 provides the main support for the wheel spacers 90A and 90B.

Of course, it should be understood that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

We claim:

1. A wheel-grid assembly comprising:

a wheel boom;

a pair of lift arms each including an extension arm segment transversely fixed to the wheel boom, disposed to fit between front or rear wheels of a vehicle to be towed, and an engaging arm segment having a pivot point designed for pivotal mounting of said engaging arm segment near an end of the extension arm segment, remote from the wheel boom, and each said engaging arm segment having an actuating arm segment and a gripping arm segment extending in different directions from the pivot point;

a pair of linear actuators each having a fixed arm segment and movable arm segment, with said fixed arm segment relatively transversely, pivotally attached to the wheel boom and said movable arm segment pivotally attached to an over-center locking mechanism for locking the engaging arm segment in an engaging position, and thereby locking said engaging arm segment without aid of force from the movable arm segment;

said engaging arm segments maintaining either an open position disposed to fit between the front or rear wheels of the vehicle to be towed when the movable arm segments of the linear actuators are at non-extended positions, or a lifting position where extension of the movable arm segments of the linear actuators pivot said engaging arm segments to engage the vehicle to be towed.

2. The wheel grid assembly of claim 1, with said linear actuators comprising a pair of hydraulic cylinders each having a hydraulic bushing, corresponding to the fixed arm segment of the linear actuator, and a hydraulic piston, corresponding to the movable arm segment of the linear actuator, with said hydraulic bushing being relatively transversely, pivotally attached to the wheel boom and said hydraulic piston being pivotally attached to the over-center locking mechanism.

3. The wheel grid assembly of claim 1, with said linear actuators comprising a pair of screw drives each having a threaded bushing and a threaded shaft, with said threaded bushing being relatively transversely, pivotally attached to the wheel boom and said threaded shaft being pivotally attached to the over-center locking mechanism.

4. The wheel grid assembly of claim 1, including a position lock mechanism comprising:

a grid lock-out switch with a grid lock-out button such that when the wheel grid is in a raised or towing position the grid lock-out button is in a non-depressed or open position preventing actuation of the linear actuators, and when the wheel grid is in a lowered or loading position the grid lock-out button is in a depressed or closed position allowing actuation of the linear actuators.

5. The wheel grid assembly of claim 1, including a position lock mechanism comprising:

a limit switch and actuating bar such that when the wheel grid is in a raised or towing position the actuating bar releases the limit switch to a non-depressed or open position preventing actuation of the linear actuators, and when the wheel grid is in a lowered or loading position the actuating bar depresses or closes the limit switch allowing actuation of the linear actuators.

6. The wheel grid assembly of claim 1, including left and right wheel spacers each comprising:

a wheel engaging surface, a top edge with at least one pin extending parallel to said top edge, a right edge and a left edge;

a spring loaded latching pin, extending through the right and left edges of the wheel spacer, with one end protruding beyond the left edge and the other end protruding beyond the right edge, comprising:

a gripping means at the end of the latching pin protruding through the left edge of the left wheel spacer and a gripping means at the end of the latching pin protruding through the right edge of the right wheel spacer;

a spring located just inside the left edge of the left wheel spacer and just inside the right edge of the right wheel spacer, with said spring being locked in place by a locking ring creating spring tension forcing the latching pin in the left wheel spacer toward the right and forcing the latching pin in the right wheel spacer toward the left;

said wheel spacer attaches to said wheel grid by inserting the pins into slot rings on a rear edge of the wheel boom, and inserting the protruding end of the spring loaded latching pin, without the gripping means, through a hole in the extension arm segment latching the wheel spacer in place.

7. A wheel grid assembly comprising:

a wheel boom;

a pair of lift arms each including an extension arm segment transversely fixed to the wheel boom, disposed to fit between front or rear wheels of a vehicle to be towed, and an engaging arm segment having a pivot point designed for pivotal mounting of said engaging arm segment near a end of the extension arm segment, remote from the wheel boom, and each said engaging arm segment having an actuating arm segment and a gripping arm segment extending in different directions from the pivot point;

a pair of linear actuators each having a fixed arm segment and movable arm segment, with said fixed arm segment relatively transversely, pivotally attached to the wheel boom and said movable arm, segment pivotally attached to an over-center locking mechanism for locking the engaging arm segment in an engaging position, said over-center locking mechanism comprising a linkage apparatus whereby full extension of the movable arm segment positions said linkage apparatus in a locking position, such that outward pressure against the engaging arm segment forces said linkage apparatus in the direction of the locking position, and thereby locking said engaging arm segment without aid of force from the movable arm segment;

said engaging arm segments maintaining either an open position disposed to fit between the front or rear wheels of the vehicle to be towed when the movable arm segments of the linear actuators are at non-extended positions, or a lifting position where extension of the movable arm segments of the linear actuators pivot said engaging arm segments to engage the vehicle to be towed.

8. The wheel grid assembly of claim 7, with said linear actuators comprising a pair of hydraulic cylinders each having a hydraulic bushing, corresponding to the fixed arm segment of the linear actuator, and a hydraulic piston, corresponding to the movable arm segment of the linear actuator, with said hydraulic bushing being relatively transversely, pivotally attached to the wheel boom and said hydraulic piston being pivotally attached to the over-center locking mechanism.

9. The wheel grid assembly of claim 7, with said linear actuators comprising a pair of screw drives each having a threaded bushing and a threaded shaft, with said threaded bushing being relatively transversely, pivotally attached to the wheel boom and said threaded shaft being pivotally attached to the over-center locking mechanism.

10. The wheel grid assembly of claim 7, including a position lock mechanism comprising;

a grid lock-out switch with a grid lock-out button such that when the wheel grid is in a raised or towing position the grid lock-out button is in a non-depressed or open position preventing actuation of the linear actuators, and when the wheel grid is in a lowered or loading position the grid lock-out button is in a depressed or closed position allowing actuation of the linear actuators.

11. The wheel grid assembly of claim 7, including a position lock mechanism comprising;

a limit switch and actuating bar such that when the wheel grid is in a raised or towing position the actuating bar releases the limit switch to a non-depressed or open position preventing actuation of the linear actuators, and when the wheel grid is in a lowered or loading position the actuating bar depresses or closes the limit switch allowing actuation of the linear actuators.

12. The wheel grid assembly of claim 7, including left and right wheel spacers each comprising:

a wheel engaging surface, a top edge with at least one pin extending parallel to said top edge, a right edge and a left edge;

a spring loaded latching pin, extending through the right and left edges of the wheel spacer, with one end protruding beyond the left edge and the other end protruding beyond the right edge, comprising:

a gripping means at the end of the latching pin protruding through the left edge of the left wheel spacer and a gripping means at the end of the latching pin protruding through the right edge of the right wheel spacer;

a spring located just inside the left edge of the left wheel spacer and just inside the right edge of the right wheel spacer, with said spring being locked in place by a locking ring creating spring tension forcing the latching pin in the left wheel spacer toward the right and forcing the latching pin in the right wheel spacer toward the left;

said wheel spacer attaches to said wheel grid by inserting the pins into slot rings on a rear edge of the wheel boom, and inserting the protruding end of the spring loaded latching pin, without the gripping means, through a hole in the extension arm segment latching the wheel spacer in place.

13. A wheel grid assembly comprising:

a wheel boom;

a pair of lift arms each including an extension arm segment transversely fixed to the wheel boom, disposed to fit between front or rear wheels of a vehicle to be towed, and an engaging arm segment having a pivot point designed for pivotal mounting of said engaging arm segment near an end of the extension arm segment, remote from the wheel boom, and each said engaging arm segment having an actuating arm segment and a gripping arm segment extending in different directions from the pivot point;

a pair of linear actuators each having a fixed arm segment and movable arm segment, with said fixed arm segment relatively transversely, pivotally attached to the wheel boom and said movable arm segment centrally, pivotally attached to an actuating link, each actuating link having one end pivotally attached to the extension arm segment of a lift arm and the other end pivotally attached to one end of a connecting link, with the other end of each connecting link being pivotally attached to the actuating arm segment of an engaging arm segment;

said engaging arm segments maintaining either an open position disposed to fit between the front or rear wheels of the vehicle to be towed when the movable arm segments of the linear actuators are at non-extended positions, or a lifting position where extension of the movable arm segments of the linear actuators pivot said engaging arm segments to engage the vehicle to be towed;

each movable arm segment in combination with said actuating link connected to it, said connecting link attached to the actuating arm segment and actuating arm segment defines a linkage which establishes an over-center locking mechanism for locking the engaging arm segment in an engaging position, whereby full extension of the movable arm segment positions said over-center locking mechanism in a locking position, such that outward pressure against the engaging arm segment forces said over-center locking mechanism in the direction of the locking position, and thereby locking said engaging arm segment without aid of force from the movable arm segment.

14. The wheel grid assembly of claim 13, with said linear actuators comprising a pair of hydraulic cylinders each having a hydraulic bushing, corresponding to the fixed arm segment of the linear actuator, and a hydraulic piston, corresponding to the movable arm segment of the linear actuator, with said hydraulic bushing being relatively transversely, pivotally attached to the wheel boom and said hydraulic piston being centrally, pivotally attached to the actuating link of the over-center locking mechanism.

15. The wheel grid assembly of claim 13, with said linear actuators comprising a pair of screw drives each having a threaded bushing and a threaded shaft, with said threaded bushing being relatively transversely, pivotally attached to the wheel boom and said threaded shaft being centrally, pivotally attached to the actuating link of the over-center locking mechanism.

16. The wheel grid assembly of claim 13, including a position lock mechanism comprising;

a grid lock-out switch with a grid lock-out button such that when the wheel grid is in a raised or towing position the grid lock-out button is in a non-depressed or open position preventing actuation of the linear actuators, and when the wheel grid is in a lowered or loading position the grid lock-out button is in a depressed or closed position allowing actuation of the linear actuators.

17. The wheel grid assembly of claim 13, including a position lock mechanism comprising;

a limit switch and actuating bar such that when the wheel grid is in a raised or towing position the actuating bar releases the limit switch to a non-depressed or open position preventing actuation of the linear actuators, and when the wheel grid is in a lowered or loading position the actuating bar depresses or closes the limit switch allowing actuation of the linear actuators.

18. The wheel grid assembly of claim 13, including left and right wheel spacers each comprising:

a wheel engaging surface, a top edge with at least one pin extending parallel to said top edge, a right edge and a left edge;

a spring loaded latching pin, extending through the right and left edges of the wheel spacer, with one end protruding beyond the left edge and the other end protruding beyond the right edge, comprising:

a gripping means at the end of the latching pin protruding through the left edge of the left wheel spacer and a gripping means at the end of the latching pin protruding through the right edge of the right wheel spacer;

a spring located just inside the left edge of the left wheel spacer and just inside the right edge of the right wheel spacer, with said spring being locked in place by a locking ring creating spring tension forcing the latching pin in the left wheel spacer toward the right and forcing the latching pin in the right wheel spacer toward the left;

said wheel spacer attaches to said wheel grid by inserting the pins into slot rings on a rear edge of the wheel boom, and inserting the protruding end of the spring loaded latching pin, without the gripping means, through a hole in the extension arm segment latching the wheel spacer in place.

19. A tow assembly for lifting a vehicle's front or rear end, comprising:

a telescopic boom connected to said tow assembly; a wheel grid assembly pivotally connected to said telescopic boom, comprising:

a pair of lift arms each including an extension arm segment transversely fixed to the wheel boom, disposed to fit between front or rear wheels of a vehicle to be towed, and an engaging arm segment having a pivot point designed for pivotal mounting of said engaging arm segment near an end of the extension arm segment, remote from the wheel boom, and each said engaging arm segment having an actuating arm segment and a gripping arm segment extending in different directions from the pivot point;

a pair of linear actuators each having a fixed arm segment, a movable arm segment and a plurality of control lines, with said fixed arm segment relatively transversely, pivotally attached to the wheel boom and said movable arm segment pivotally attached to an over-center locking mechanism for locking the engaging arm segment in an engaging position, and thereby locking said engaging arm segment without aid of force from the movable arm segment;

said engaging arm segments maintaining either an open position disposed to fit between the front or rear wheels of the vehicle to be towed when the movable arm segments of the linear actuators are at non-extended positions, or a lifting position where extension of the movable arm segments of the linear actuators pivot said engaging arm segments to engage the vehicle to be towed.

20. The tow assembly of claim 19, with said linear actuators comprising a pair of hydraulic cylinders each having a hydraulic bushing, corresponding to the fixed arm segment of the linear actuator, and a hydraulic piston, corresponding to the movable arm segment of the linear actuator, with said hydraulic bushing being relatively transversely, pivotally attached to the wheel boom and said hydraulic piston being pivotally attached to the over-center locking mechanism.

21. The tow assembly of claim 19, with said linear actuators comprising a pair of screw drives each having a threaded bushing, corresponding to the fixed arm segment of the linear actuator, a threaded shaft, corresponding to the movable arm segment of the linear actuator, and a screw drive motor, with said threaded bushing being relatively transversely, pivotally attached to the wheel boom and said threaded shaft being pivotally attached to the over-center locking mechanism.

22. The tow assembly of claim 19, with an automatic linear actuator control line retractor assembly attached to said telescopic boom, for automatically drawing in said linear actuator control lines, having a pulley attached, via a connecting cable, to a spring loaded dispensing reel enabling automatic supply and storage of the linear actuator control lines.

23. A tow truck for lifting a vehicle's front or rear end, and for transporting said vehicle, comprising:

a tow truck chassis including a bed frame and a deck situated above said bed frame;

a tow assembly connected to said truck chassis for lifting a vehicle's front or rear end, by its front or rear wheels comprising:

a telescopic boom connected to said tow assembly;

a wheel grid assembly pivotally connected to said telescopic boom, said wheel grid comprising:

a pair of lift arms each including an extension arm segment transversely fixed to the wheel boom, disposed to fit between said front or rear wheels of the vehicle to be towed, and an engaging arm segment having a pivot point designed for pivotal mounting of said engaging arm segment near an end of the extension arm segment, remote from the wheel boom, and each said engaging arm segment having an actuating arm segment and a gripping arm segment extending in different directions from the pivot point;

a pair of linear actuators each having a fixed arm segment, a movable arm segment and a plurality of control lines, with said fixed arm segment relatively transversely, pivotally attached to the wheel boom and said movable arm segment pivotally attached to an over-center locking mechanism for locking the engaging arm segment in an engaging position, and thereby locking said engaging arm segment without aid of force from the movable arm segment;

said engaging arm segments maintaining either an open position disposed to fit between the front or rear wheels of the vehicle to be towed when the movable arm segments of the linear actuators are at non-extended positions, or a lifting position where extension of the movable arm segments of the linear actuators pivot said engaging arm segments to engage the vehicle to be towed.

24. The tow truck of claim 23, with said deck assembly constituting a car carrier for transporting vehicles positioned entirely upon said deck assembly, and having said deck assembly pivotally attached to the bed frame, with said deck assembly being pivotally movable relative to said bed frame from a transport position generally parallel to the bed frame to a loading position extending at an angle relative to the bed frame and contacting the ground for loading a vehicle to be transported, said deck assembly being suitable for receiving at least one vehicle positioned on said assembly.

25. The tow assembly of claim 23, with an automatic linear actuator control line retractor assembly attached to said telescopic boom, for automatically drawing in said linear actuator control lines, having a pulley attached, via a connecting cable, to a spring loaded dispensing reel enabling automatic supply and storage of the linear actuator control lines.

26. A position lock mechanism for use in a tow vehicle with a wheel grid, comprising:

a grid lock-out switch with a grid lock-out button such that when the wheel grid is in a raised or towing position the grid lock-out button is in a non-depressed or open position preventing actuation of linear actuators included in the wheel grid which prevents releasing a vehicle in tow, and when the wheel grid is in a lowered or loading position the grid lock-out button is in a depressed or closed position allowing actuation of the linear actuators which allows the release of said vehicle.

27. A position lock mechanism for use in a tow vehicle with a wheel grid, comprising:

a limit switch and actuating bar such that when the wheel grid is in a raised or towing position the actuating bar releases the limit switch to a non-depressed or open position preventing actuation of linear actuators included in the wheel grid which prevents releasing a vehicle in tow, and when the wheel grid is in a lowered or loading position the actuating bar depresses or closes the limit switch allowing actuation of the linear actuators which allows the release of said vehicle.

28. A wheel spacer for adapting a wheel grid assembly for different sized wheels of a vehicle to be towed, comprising:

a wheel engaging surface, a top edge with at least one pin extending parallel to said top edge, a right edge and a left edge, said pin for mounting the wheel spacer on a wheel boom of the wheel grid assembly such that the wheel spacer pivots into a position within a wheel cradle formed by said wheel boom and a lift arm transversely mounted thereto;

a spring loaded latching pin, extending through the right and left edges of the wheel spacer, with one end protruding beyond the left edge and the other end protruding beyond the right edge, comprising:
  a gripping means at one end of the latching pin;
  a spring located just inside the edge of the wheel spacer with the end of the latching pin containing the gripping means, with said spring being locked in place by a locking ring creating spring tension forcing the latching pin in a direction away from the gripping means and toward the wheel spacer.

29. A pair of left and right wheel spacers for adapting a wheel grid assembly for different sized wheels of a vehicle to be towed, each comprising:

a wheel engaging surface, a top edge with at least one pin extending parallel to said top edge, a right edge and a left edge, said pin for mounting the wheel spacer on a wheel boom of the wheel grid assembly such that the wheel spacer pivots into a position within a wheel cradle formed by said wheel boom and a lift arm transversely mounted thereto;

a spring loaded latching pin, extending through the right and left edges of the wheel spacer, with one end protruding beyond the left edge and the other end protruding beyond the right edge, comprising:
  a gripping means at the end of the latching pin protruding through the left edge of the gripping means at the end gripping means at the end of the latching pin protruding through the right edge of the right wheel spacer;
  a spring located just inside the left edge of the left wheel spacer and just inside the right edge of the right wheel spacer, with said spring being locked in place by a locking ring creating spring tension forcing the latching pin in the left wheel spacer toward the right and forcing the latching pin in the right wheel spacer toward the left.

* * * * *

UNITED STATES PATENT AND TRADEMARK OFFICE
CERTIFICATE OF CORRECTION

PATENT NO. : 5,722,810
DATED : March 3, 1998
INVENTOR : Charles E. Young et al.

It is certified that error appears in the above-identified patent and that said Letter Patent is hereby corrected as shown below:

In the claims:

Claim 7, line 26, delete "a" and insert --an--.

Claim 29, lines 22 and 23 delete "gripping means at the end gripping means" and insert --left wheel spacer and a gripping means--.

Signed and Sealed this

Twenty-fourth Day of October, 2000

Attest:

Q. TODD DICKINSON

*Attesting Officer*      *Director of Patents and Trademarks*